(12) United States Patent
Vassallo

(10) Patent No.: US 6,580,662 B2
(45) Date of Patent: Jun. 17, 2003

(54) COOKING TIMER DEVICE

(75) Inventor: Stephen Vassallo, Paola (MT)

(73) Assignee: Deeco LTD (MT)

( * ) Notice: Subject to any disclaimer, the term of this patent is extended or adjusted under 35 U.S.C. 154(b) by 0 days.

(21) Appl. No.: 09/862,575

(22) Filed: May 22, 2001

(65) Prior Publication Data

US 2002/0018401 A1 Feb. 14, 2002

(30) Foreign Application Priority Data

May 23, 2000 (MT) ................................................ 1457

(51) Int. Cl.$^7$ ........................ G04B 47/06; G01K 13/12
(52) U.S. Cl. ........................ 368/11; 368/10; 374/100; 374/190
(58) Field of Search .............. 368/10, 11; 374/100–209

(56) References Cited

U.S. PATENT DOCUMENTS

| | | | | |
|---|---|---|---|---|
| 3,636,769 A | * | 1/1972 | Chaney | 374/190 |
| 3,845,661 A | * | 11/1974 | Holloweck | 374/208 |
| 3,859,644 A | * | 1/1975 | Main | 99/344 |
| 3,965,741 A | * | 6/1976 | Wachtell et al. | 374/102 |
| 3,967,502 A | | 7/1976 | Moran | |
| 3,998,099 A | * | 12/1976 | Chadwick | 374/194 |
| 4,083,250 A | | 4/1978 | Goff et al. | |
| 4,089,222 A | * | 5/1978 | Perkins | 116/101 |
| 4,466,742 A | * | 8/1984 | Lemelson | 368/10 |
| 4,492,479 A | | 1/1985 | Hatsuse et al. | |
| 5,088,069 A | * | 2/1992 | Koziol | 368/10 |
| 5,918,981 A | * | 7/1999 | Ribi | 374/162 |
| 5,947,370 A | * | 9/1999 | Rona | 236/20 A |
| 6,068,399 A | * | 5/2000 | Tseng | 374/163 |
| 6,412,398 B1 | * | 7/2002 | Norcross et al. | 99/342 |
| 6,501,384 B2 | * | 12/2002 | Chapman et al. | 340/584 |
| 2002/0009121 A1 | * | 1/2002 | SIU | 374/155 |

FOREIGN PATENT DOCUMENTS

| | | |
|---|---|---|
| EP | 1 157 645 | 11/2001 |
| FR | 2 634 914 | 2/1990 |
| JP | 9-269385 | 10/1997 |
| JP | 2000-310567 | 11/2000 |

* cited by examiner

*Primary Examiner*—David Martin
*Assistant Examiner*—Michael L. Lindinger
(74) *Attorney, Agent, or Firm*—Leffert Jay & Polglaze, P.A.

(57) ABSTRACT

A device for timing the cooking of a food item, comprising timing means, apt to compute a cooking time interval, signalling means, actuatable by the timing means to signal that the time interval has elapsed, and temperature sensitive means, apt to be arranged in proximity of the food item and to determine the starting of computing of the time interval by the timing means at a pre-determined temperature.

24 Claims, 4 Drawing Sheets

COOKING TIMER DEVICE

FIELD OF THE INVENTION

The present invention relates to a timer device, and in particular to a device for timing the cooking or heating of a food item.

BACKGROUND OF THE INVENTION

Cooking or heating food to the exact degree of doneness can be a tricky and frustrating everyday task. For example, boiling eggs easily ends up in sloppy undercooked eggs or in rock-hard overcooked ones.

In order to simplify such task, timers are currently employed which the user switches on to start computing the cooking time.

These known-art timers suffer from some relevant drawbacks.

The main drawback lies in the fact that they rely on the person doing the cooking to begin the timing manually. This brings inconsistent results from time to time, because, depending on the heat source, on the cooking container used and in general on the cooking conditions, the food item to be cooked takes different times to reach the ideal cooking temperature.

Furthermore, in case of boiling, the person managing the timer has to wait for the water to boil to actuate the timer. This latter task is particularly annoying and frustrating, because it results in the necessity to wait and watch continuously the cooking container, instead of completing the meal preparation or doing other business. Moreover, it still leads to inconsistent results, because it is practically impossible to discriminate by looking when the water has reached the right temperature of actual full boiling.

SUMMARY OF THE INVENTION

The technical problem underlying the present invention is that of providing a device allowing to overcome the drawbacks mentioned above with reference to the known art.

Such problem is solved by a device for timing the cooking of a food item, comprising:
  timing means, apt to compute a cooking time interval, and
  signalling means, actuatable by said timing means to signal that said time interval has elapsed,
  characterised in that it further comprises:
  temperature sensitive means, apt to be arranged in proximity of the food item and to determine the starting of computing of said time interval by said timing means at a pre-determined temperature.

In the present context, with "cooking" of a food item it is of course to be understood also the simple "warming up" of an already fully cooked item.

The present invention provides some relevant advantages. The main advantage lies in the fact that it allows an automatic starting of the cooking timing, thus providing optimal and consistent cooking results.

Other advantages, features and operation steps of the present invention will be made apparent in the detailed description of some embodiments thereof, given by way of example and not for limitative purposes. It will be made reference to the figures of the annexed drawings, wherein:

DETAILED DESCRIPTION

Figure 1:
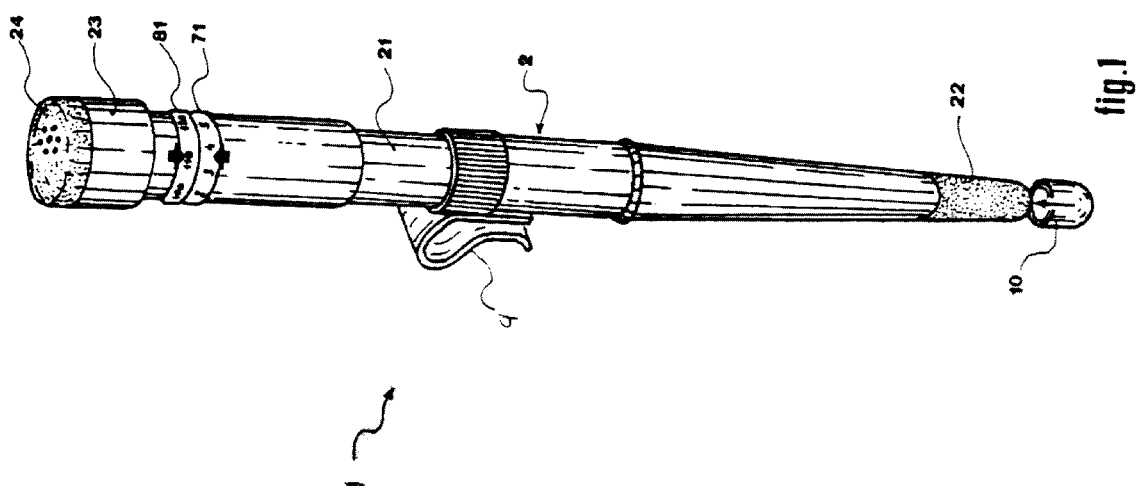
FIG. 1 shows a perspective view of a first embodiment of the device according to the present invention.

Referring initially to FIG. 1, a device for timing the cooking of a food item is globally indicated by 1. As it will be better explained later on, the device 1 is apt to engage a wall of a cooking container such as a pot, a pan, a saucepan and the like to time the cooking of the food item lodged therein.

Device 1 comprises an external case 2 having an elongated shape, formed by an upper body portion 21 and a bottom tip portion 22, the latter being shaped substantially as a rounded cone.

The body portion 21, in its turn, includes a substantially cylindrical upper part having a diameter of approximately 12 mm and a tapered lower part. The cylindrical upper part terminates upwardly with a removable, watertight cap member 23 having a transparent cover wall 24 at its upper end section.

Preferably, case 2 is made of a food-grade material. Furthermore, the entire case 2, with the possible exception of the tip portion 22, is made of a thermal insulating material such as a heat-resistant thermal plastic material, in order to act as a heat shield for internal components of the device 1 that will be described later on.

Moreover, case 2 is sealed to keep out any fluid, in particular water, and to ensure no leakage from the aforementioned internal components.

Preferably, case 2 has an overall length of about 160 mm.

Figure 2A:
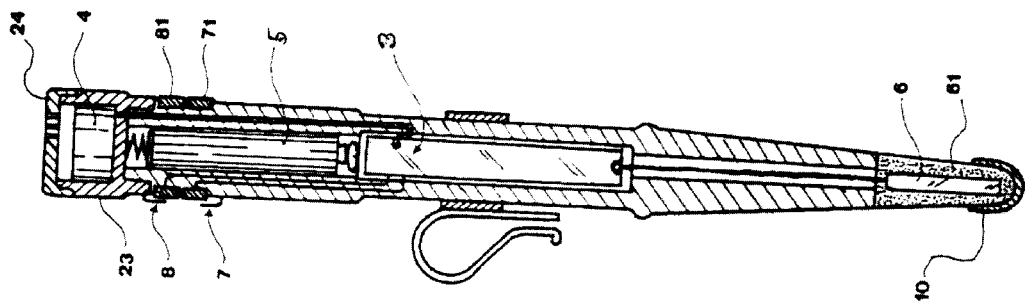
FIG. 2A shows a sectional view of the device of FIG. 1.
Figure 2B:
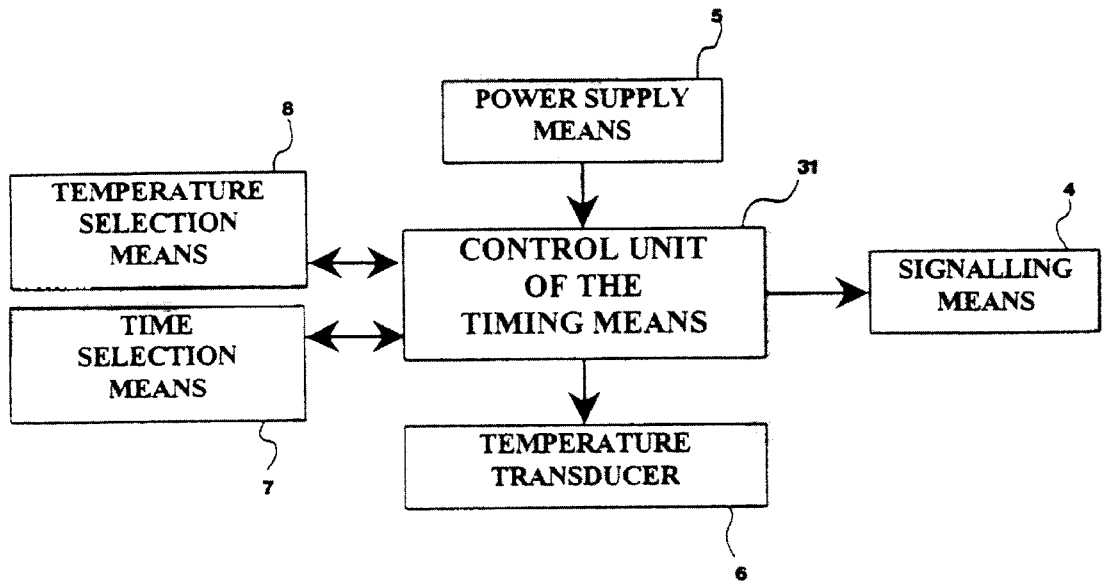
FIG. 2B shows a block diagram illustrating schematically operation of the device of FIG. 1.

As schematically shown in FIGS. 2A and 2B, inside the case 2, and in particular at the body portion 21 thereof, device 1 comprises a plurality of electric and electronic components that will be now described.

First of all, device 1 comprises timing means 3 apt to compute a cooking time interval. In the present embodiment, the timing means 3 comprises a timing circuit controlled by a control unit, for example a microchip, indicated by 31 in FIG. 2B.

Device 1 also comprises signalling means 4, arranged above the timing means 3 and in electrical connection with this latter means to be actuated thereby. In particular, in the present embodiment such signalling means 4 are of an audio and luminous type and comprises a lighting buzzer, indicated also with 4, visible through the transparent cover wall 24 of case 2.

Between the buzzer 4 and the timing means 3, a lodgement for power supply means 5, in particular one or more alkaline batteries, is obtained. Such lodgement is accessible by removing the watertight cap 23, which makes replacement of the batteries extremely easy.

The operation modes of device 1 that will be explained later on allow such batteries to last for about three years or approximately three-hundred boils, whichever comes first.

As the timing means 3, the signalling means 4, the power supply means 5 and the related connections are implemented by conventional means, they have been represented only schematically in FIGS. 2A and 2B and will not be further described.

It is understood that all such means can be implemented either by an analog or digital technology.

According to the invention, device 1 further comprises temperature sensitive means 6, arranged inside the case 2 at the tip portion 22 thereof and apt to determine the starting of computing of said time interval by the timing means 3. In the present embodiment, such means 6 comprises a temperature sensor or transducer, like, e.g., a thermocouple, also indicated with 6. Transducer 6 is connected to the control unit 31 of the timing means 3 to determine the start of computing of said cooking interval when detecting a predetermined temperature, as it will be illustrated in greater detail with reference to the operation modes of device 1.

The temperature transducer 6 is immersed in a potting compound 61, which allows to seal the related joint and to enhance heat conduction towards the transducer itself, so as to enable better sensing of the temperature of the food item.

Transducer 6 can be actuated automatically by a temperature-sensitive switch associated therewith when the temperature of the tip portion 22 rises. In this case, device 1 does not need to be switched on or off, as it intelligently switches itself on and off when exposed to a heat source, thus saving on battery energy and making it extremely easy for anyone to use.

Alternatively, transducer 6 can be continuously energized by power supply means 5 or actuated by the user through a suitable user-operable switch.

In the present embodiment, device 1 further comprises user-operable time selection means 7 for selecting the time interval to be computed by the timing means 3. Such time selection means 7 includes, as an external user interface, a movable time-ring 71 of a conventional type. Such time-ring 71 engages an upper part of body portion 21 of case 2 and it is of course connected to the timing means 3.

Device 1 further comprises user-operable temperature selection means 8 for selecting the predetermined temperature at which the timing means 3 have to start timing the cooking interval. Such temperature selection means 8 includes, as an external user interface, a movable temperature-ring 81 analogous to the time-ring 71.

As schematically shown in FIG. 2B, it is provided that time and temperature selection means, respectively 7 and 8, as well as the signalling and temperature-sensitive means 4 and 6, are power-supplied through the timing means 3.

Device 1 also comprises engaging means for engaging the aforementioned cooking container, which in the present embodiment consists of a clip 9 apt to engage a wall portion of said container. The position of clip 9 with respect to body portion 21 can be adjusted by sliding the clip itself between an upper and a lower abutment edge of said body portion 21.

Device 1 also comprises means for delaying the transmission of heat to the temperature transducer 6. In the present embodiment, such means is a removable tip-cover 10, apt to be superimposed to the tip portion 22. Such tip-cover 10 can be made for example of plastics or rubber.

The device of the invention can also be provided with a plurality of tip-covers, having different colours and thickness, each adapted for the timing of a specific foodstuff to be cooked.

The operation of device 1 will be now described with reference to FIGS. 2B and 3 and in relation to the boiling of an egg E in a cooking container C.

First of all, by means the time-ring 71 the user can select the duration of the cooking time interval to be counted by the timing means 3.

Analogously, by means the temperature-ring 81 the user can select the predetermined temperature at which he/she wants such means 3 to start timing the cooking time.

In the present case, the user presumably would select a time interval of about three minutes and a temperature equal to or above 85° C. (185° F.).

Figure 3:
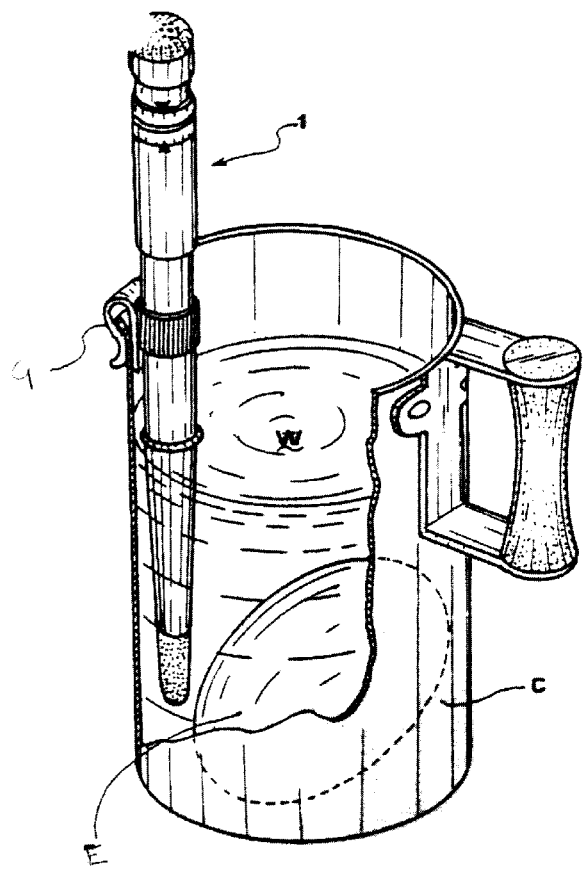
FIG. 3 shows a perspective view of the device of FIG. 1 during operation.

Then, as shown in FIG. 3, the device 1 is clipped onto the inside top edge of container C, so that the tip portion 22 hangs on the inside of the container itself and is immersed in water W.

The container C can be put upon a heat source, e.g., an electric, gaseous or ceramic source, either before or after application of device 1.

In any case, as water W in the container warms up, heat is transmitted to the temperature transducer 6 inside the tip portion 22, which is therefore exposed to substantially the same temperature of the egg E.

Substantially at the same time water W reaches the set temperature, the control unit 31 of timing means 3 connected to transducer 6 detects that the predetermined temperature has been reached, thus determining the starting of computing of the chosen cooking time interval. Once such interval has elapsed, the timing means 3 actuates the buzzer 4, which, by luminous and acoustic signals, draws the user attention to the fact that the selected cooking time has ended, i.e., that egg E is soft boiled to the right degree.

Therefore, the user can remove the device 1, either together or separately from the container C, from the heat source, so that transducer 6 cools down.

If the transducer 6 is associated with the aforementioned temperature-sensitive switch, then such switch can automatically switch off device 1 when the temperature lowers. To this aim, device 1 can be either left cooling down, so that it switches off within approximately one minute, or cooled under cold water, so that it switches off within a few seconds.

If the cooking operation is carried out employing also the tip-cover 10, the start of timing of the cooking interval will be delayed due to the increased time necessary for heat transfer from the water W to the transducer 6.

Accordingly, as already mentioned above, the provision of a plurality of tip-covers enables the user to easily convert the device to time foodstuffs other than eggs.

Alternative embodiments may provide, instead of removable tip-covers, a plurality of removable tip portions having different heat transmission ratios, each adapted for timing the cooking of a specific food item.

Of course, the device can be adapted to compute cooking time intervals of different foodstuffs also by varying the choice of the cooking interval and of said predetermined temperature. For example, device 1 can be used as a baby-milk, hot-milk and boiling-water monitor and also as an overflow alarm.

It will be appreciated at this point that the adjustable clip 9 enables the device to fit practically all types of pots and pans in a very simple way. In particular, the clip 9 can be easily attached to, or removed from, pots and pans of practically any size and shape.

Furthermore, the elongated shape and small size of the device 1 enables as many eggs as possible (or as many as required) to fit inside the pot or pan.

Moreover, the fact that the timing and signalling means 3 and 4, respectively, and the battery are all placed inside the top part of case 2 ensures that they are not exposed to temperatures exceeding 85° C., which is a safe limit for these components to operate within.

It will be now better appreciated that the device of the invention allows obtaining perfect cooking results every time, regardless of the type and size of the cooking utensil and type of heat source used. Device 1 provides proper timing also when it is placed in a container of already-boiling water.

Furthermore, the device is easy and safe for practically anyone to use, fits in pans of any type and size and requires no effort or knowledge to obtain consistent results.

It will also be understood that the temperature sensitive means of the invention needs, in general, to be in proximity of the food item to be cooked or heated. In the above examples, it was provided for such means to be immersed in the cooking water of the food item. It is understood that alternative embodiments may provide for such means to be in direct contact with the food item.

Figure 4:
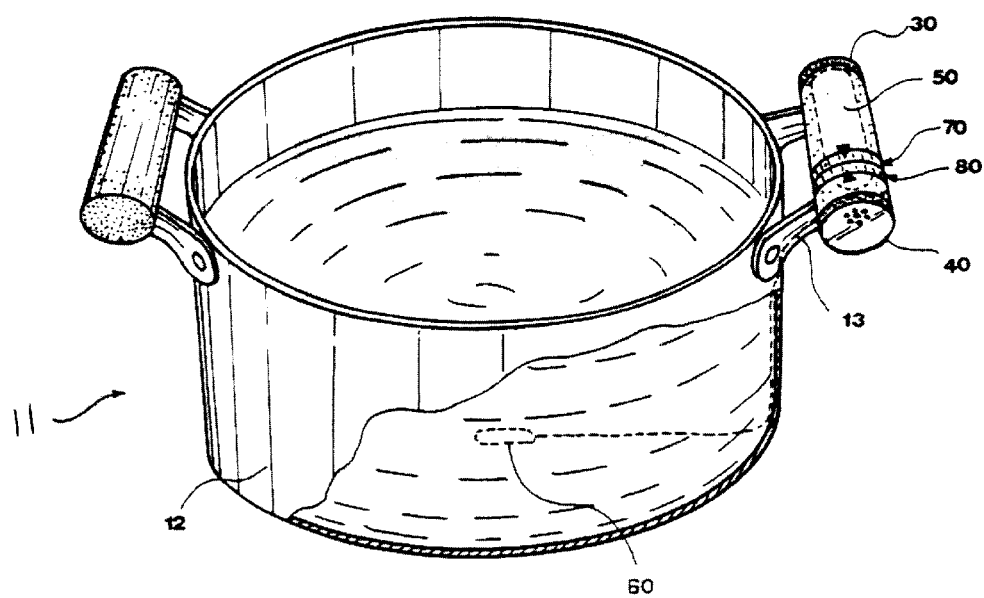
FIG. 4 shows a perspective view of a second preferred embodiment of the device according to the present invention.

With reference now to FIG. 4, a device according to a second preferred embodiment of the invention is indicated by 11.

Device 11 comprises a cooking container 12 having a couple of handles 13 made of a temperature-resistant, insulating material such as plastics.

The container 12 houses timing means 30, signalling means 40, temperature sensitive means 60, power supply means 50 and user-operable time and temperature selection means 70 and 80, respectively, substantially analogous to those already described with reference to the first embodiment and represented only schematically in FIG. 4.

In particular, this embodiment provides that the temperature sensitive means 60 are arranged at the bottom or side wall of the cooking container 12. Through suitable, conventional connections, such means 60 are connected to the other electrical components housed in one of the handles 13 of container 12.

Also device 11 can be used to warm-up or cook different food and drink products (such as milk, eggs and pasta) and give audio signals at required temperature and time intervals.

Figure 5:
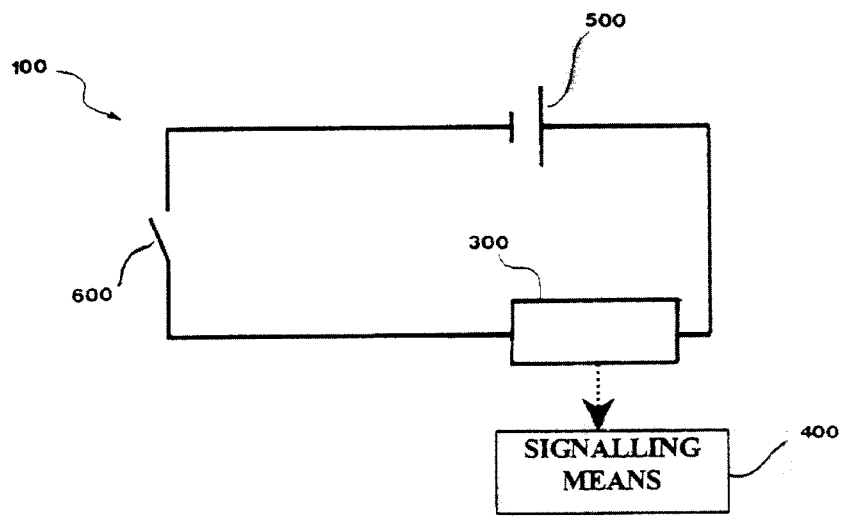
FIG. 5 shows a schematic representation of a third preferred embodiment of the device according to the invention.

With reference now to FIG. 5, the invention also provides a simplified embodiment of the device, in this case indicated by 100. Device 100 comprises temperature sensitive means, consisting essentially of a simple thermal switch 600, for example metal-based. Such switch 600 is connected to timing means 300 and power supply means 500 so as to form a single electric circuit. The thermal switch 600 is apt, by closing its contacts, to close such circuit when reaching a pre-determined temperature, thus connecting the power supply means 500 to the timing means 300 for starting the computing of a cooking time interval.

Once the time interval has elapsed, the timing means 300 actuates signalling means 400.

Analogously, when the temperature lowers, the thermal switch 600 opens the circuit.

The above components can be housed either in a case like that described in conjunction with the first embodiment or a cooking container as that of the second preferred embodiment.

In this simplified embodiment, the time interval to be computed by the timing means 300 and the predetermined temperature at which such timing means 300 is switched on are both pre-set, i.e., not selectable by the end user. For example, device 100 can be specifically conceived as an egg-boiler or an egg-boiling aid, and therefore the pre-set time and temperature be an egg boiling time and temperature, e.g., about three minutes and about or above 85° C. (185° F.), respectively.

It will be appreciated that also the device 100 of this simplified embodiment does not need to be switched on or off.

Figure 7:
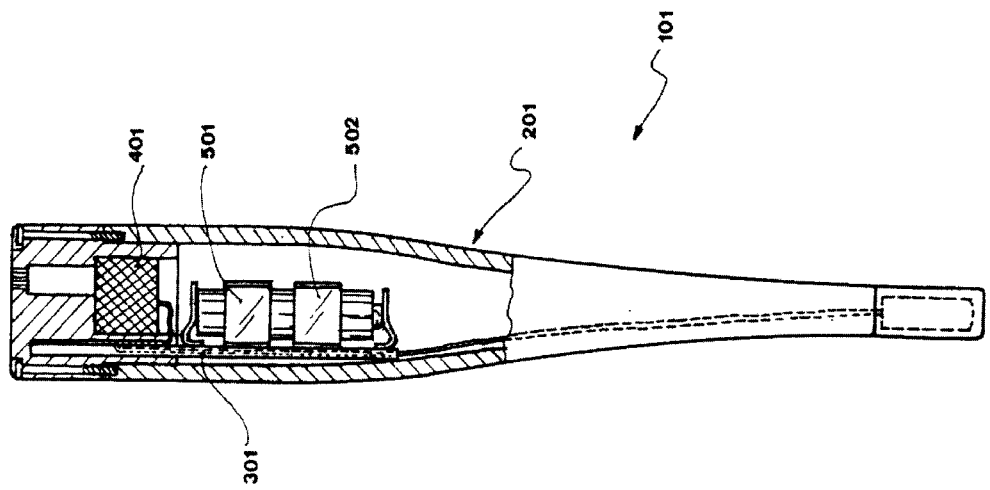
FIG. 7 shows a longitudinal sectional view of the device of FIG. 6.
Figure 6:
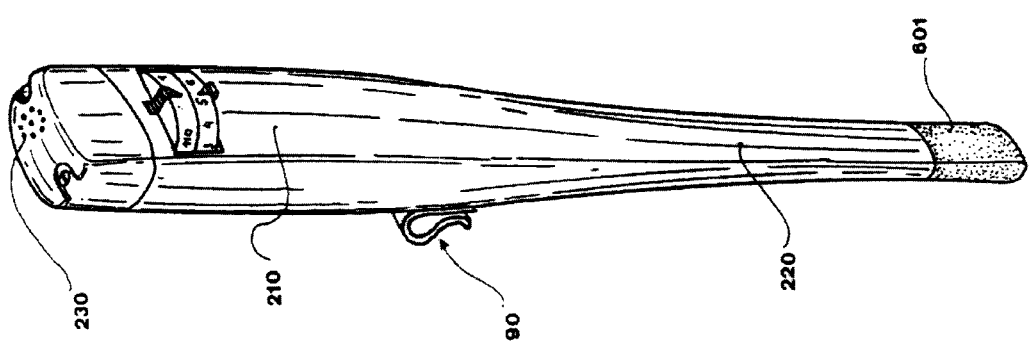
FIG. 6 shows a perspective view of a fourth preferred embodiment of the device according to the invention.

With reference to FIGS. 6 and 7, according to a fourth preferred embodiment of the invention a device for timing the cooking of a food item is globally indicated by 101. Device 101 will be hereon described only with reference to its differences with respect to the previous embodiments illustrated above, in particular the first embodiment. Accordingly, components analogous to those already described will be denoted by the same reference numbers.

As already the device of the first embodiment, device 101 is apt to engage a wall of a cooking container by engaging means 90, in particular a clip, which in the present embodiment is fixed instead that adjustable in position.

Device 101 comprises an elongated external case 201 having cross sections shaped substantially as a rounded rectangle. Case 201 includes an enlarged upper portion 210 and a narrower lower portion 220. Differently from the previous embodiment, both the top and the bottom end section of case 201 are flat.

At said top portion, through holes 230 are provided to facilitate hearing of audio signals emitted by signalling means 401 lodged inside case 201.

The remaining features of case 201, and in particular the materials used and its overall construction, can be the same already described with reference to the first embodiment of the invention.

Device 101 also comprises timing means 301, implemented by a ceramic hybrid circuit and related electronics, comprising in particular a control unit. The board of such circuit also carries, at a lower portion, battery clips 502, provided to keep in place power supply means 501, in particular a battery.

The timing means 301, signalling means 401, and battery 501 are entirely housed in the upper portion 210 of case 201 by virtue of the enlarged shape and flat top end section thereof. This arrangement makes device 101 extremely compact and easy to manufacture and assemble and allows obtaining a low-cost product, which at the same time operates at high temperatures and gives consistent cooking results.

It is of course understood that other arrangements are possible, which the person skilled in the art can envisage during his/her normal assembly activity.

In this fourth embodiment it is provided that the signalling means 401 is apt to emit, at different times during cooking of a certain item, different audio signals corresponding to the time interval elapsed, so as to signal to a user the degree of cooking reached.

In particular, such audio signals are different sequences of a same "beep"-tone. For example, in case that an egg is being boiled, device 101 provides that a single-beep sequence lasting thirty seconds is emitted at the end of a time interval corresponding to a soft-boiled egg, a double-beep sequence of thirty seconds at the end of a time-interval corresponding to a medium-soft boiled egg, a quadruple-beep sequence of thirty seconds at the end of a time-interval corresponding to a medium-hard boiled egg and a continuous-beep sequence of thirty seconds at the end of a time-interval corresponding to a hard boiled egg.

It will be understood that when device 101 is used for timing other foodstuffs, the different beep sequences can be related to different stages of cooking and can also compensate for differences in cooking pots/pans and in the environmental conditions like, e.g., heat source, amount of food and so on.

Furthermore, other embodiments can provide different signals, e.g., different tones associated with the different time intervals elapsed.

It will be understood that the above differentiated signalling can be obtained by signalling means and timing means of a conventional type, incorporating, as said above, a control unit controlling a buzzer as those of the first embodiment.

Furthermore, such signalling and timing means apt to provide different signals corresponding to different degrees of cooking could also be incorporated in a cooking container as that of the second embodiment presented above.

According to the invention, device 101 further comprises temperature sensitive means 601 analogous to those of the first embodiment, arranged inside the case 201 at the bottom section of narrower portion 220 thereof and apt to determine the starting of computing of said time interval by the timing means 301.

It is of course understood that device 101 can also comprise user-operable time selection means and user-operable temperature selection means, represented schematically in FIG. 6, and also means for delaying the transmission of heat to the temperature sensitive means 601 as those of the first embodiment.

The present invention has been hereto described with reference to preferred embodiments thereof. It is understood that other embodiments might exist, all falling within the concept of the same invention, and all comprised within the protective scope of the claims hereinafter. Accordingly, this application is intended to cover any adaptations or variations of the invention. It is thus intended that this invention be limited only by the following claims and equivalents thereof.

What is claimed is:

1. A cooking timer device for timing the cooking of a food item received inside a cooking container, comprising:
    timing means, apt to compute a cooking time interval;
    signalling means, actuatable by said timing means to signal that said time interval has elapsed; and
    temperature sensitive means, apt to be arranged in proximity of the food item and to determine the starting of computing of said time interval by said timing means at a pre-determined temperature;
    wherein said temperature sensitive means comprises a thermal switch apt to automatically switch on the device when the temperature inside the cooking container raises above a threshold and to automatically switch off the device when the temperature inside the cooking container lowers below said threshold.

2. The device according to claim 1, wherein said temperature sensitive means comprises a temperature transducer.

3. The device according to claim 1, wherein said temperature sensitive means are arranged in a portion of the device filled with a potting compound.

4. The device according to claim 1, wherein said predetermined temperature is pre-set as about 85° C. (185° F.).

5. The device according to claim 1, comprising user-operable temperature selection means for selecting said predetermined temperature according to a desired cooking operation.

6. The device according to claim 1, wherein said time interval is pre-set as an egg boiling time.

7. The device according to claim 1, comprising user-operable time selection means for selecting said time interval.

8. The device according to claim 1, wherein said timing means comprises a control unit connected to said temperature sensitive means.

9. The device according to claim 1, wherein said signalling means comprises audio signalling means.

10. The device according to claim 9, wherein said audio signalling means comprises a buzzer.

11. The device according to claim 1, having engaging means for connection with the cooking container arranged onto a heat source.

12. The device according to claim 11, wherein the position of said engaging means is adjustable.

13. The device according to claim 1, comprising an external case having an elongated shape, said case comprising a bottom tip portion and an upper body portion, wherein said temperature sensitive means are arranged at said tip portion.

14. The device according to claim 11, wherein said engaging means comprises a clip apt to engage a wall portion of the cooking container.

15. The device according to claim 14, comprising an external case having an elongated shape, said case comprising a bottom tip portion and an upper body portion, wherein said clip is slidable upon said body portion.

16. The device according to claim 13, comprising at least a removable tip-cover apt to be superimposed to said tip portion to delay heat transmission to said temperature sensitive means.

17. The device according to claim 16, comprising a plurality of removable tip covers, each for timing the cooking of a specific food item.

18. The device according to claim 13, comprising a plurality of removable tip portions, each for timing the cooking of a specific food item.

19. The device according to claim 13, wherein said case comprises, at said body portion, a lodgement for power supplying means and a removable watertight cap member apt to seal said lodgement.

20. The device according to claim 1, comprising a cooking container, housing said timing, signalling and temperature sensitive means.

21. The device according to claim 20, wherein said cooking container has at least a handle inside which said timing means are arranged.

22. The device according to claim 20, wherein said cooking container is an egg boiler.

23. The device according to claim 1, wherein said signalling means is apt to emit, at different times during cooking of the food item, different audio signals corresponding to the cooking time interval elapsed.

24. The device according to claim 23, wherein said different audio signals are sequences of a same tone.

* * * * *